United States Patent [19]

Kosugi

[11] Patent Number: 4,813,278

[45] Date of Patent: Mar. 21, 1989

[54] METHOD OF DETERMINING THREE-DIMENSIONAL TECTONIC STRESSES

[75] Inventor: Masayuki Kosugi, Tsukuba, Japan

[73] Assignee: Director-General of Agency of Industrial Science and Technology, Japan

[21] Appl. No.: 172,081

[22] Filed: Mar. 23, 1988

[51] Int. Cl.⁴ ............................................ G01N 19/06
[52] U.S. Cl. ........................................ 73/783; 73/153; 73/784
[58] Field of Search ................. 73/783, 784, 794, 819, 73/825, 153

[56] References Cited

FOREIGN PATENT DOCUMENTS 175233 10/1982 Japan ..................................... 73/783
678361 8/1979 U.S.S.R. ................................ 73/825

Primary Examiner—Jerry W. Myracle
Attorney, Agent, or Firm—Lorusso & Loud

[57] ABSTRACT

A complete, three-dimensional stress state of underground rock is determined by a method which includes the steps of: drilling a rock to form a borehole with a substantially spherical bottom; deforming the borehole either by releasing the rock from the stresses by overcoring or by applying an external static pressure to the rock; and measuring displacements of the spherical bottom in at least xx, yy, zz, xy, yz and zx radial directions during the deformation of the borehole.

8 Claims, 3 Drawing Sheets

METHOD OF DETERMINING THREE-DIMENSIONAL TECTONIC STRESSES

BACKGROUND OF THE INVENTION

This invention relates to a method for the determination of a complete state of tectonic stresses.

Stress state of underground rock provides basic data to be used for earthquake prediction, design of tunnel construction, etc. Stress-relief techniques and hydraulic fracturing technique are now generally adopted for the determination of in situ stresses.

The hydraulic-fracturing method includes measuring the breakdown pressure and the direction of the fracture created by hydrostatic pressurization in a borehole at a deep point. This method, however, cannot give three-dimensional stresses in one borehole. Further, because of the micro-discontinuities on the borehole wall, reliable data cannot be obtained unless the measurement is conducted repeatedly.

One known stress-relief method includes measuring changes in diameter of a borehole during overcoring to calculate the stresses in the plane perpendicular to the axis of the borehole. With this method, however, it is not possible to determine three-dimensional stresses in one measurement.

Another well known stress-relief method includes measuring the strains which occur in the wall surfaces of a borehole when the stresses are relieved by overcoring. Strain gauges are used to measure the strains. This method, however, cannot give reliable data because of the heterogeneity of the wall surfaces of the borehole. That is, since the underground rock is composed of mineral particles with different sizes and different physical properties and has pre-existing microcracks, measured strains vary according to the positions of the wall surfaces to which the strain gauges are attached. Therefore, reliable data cannot be obtained unless the measurement is repeated a number of times or carried out using sufficiently long strain gauges. However, formation of a borehole and an overcore requires much time and money. This is especially so in the case of a large diameter borehole. Accordingly, from the standpoint of economy, it is practically impossible to conduct a number of measurements or use large sized strain gauges to the extent that reliable data are obtainable.

There is also known a method, generally called differential crack strain analysis, for the determination of rock stresses. By coring operation, the rock is released from the in situ stresses so that microcracks open up as stress relief cracks. The differential crack strain analysis measures the crack strains from which in situ stresses are calculated. More particularly, a cubic sample is cut from the core and three strain gauges are mounted on three perpendicular faces, respectively. Then, the sample is jacketed and hydrostatically pressurized while measuring the strains to obtain a strain-pressure curve. By projecting the asymptotic slope of the strain-pressure curve back to zero pressure, there is obtainable the crack strain. Since this method measures the surface strains, rather than the actual deformation, caused by the hydrostatic pressure, the rock stresses determined by this method lack reliability.

SUMMARY OF THE INVENTION

It is, therefore, an object of the present invention to provide a novel method which can determine the three-dimensional stresses of a rock with a high reliability.

Another object of the present invention is to provide a method of the above-mentioned type which may be performed with considerably reduced time and costs.

It is a special object of the present invention to provide a method which can determine the stresses of underground rock both by an in situ measurement and by a laboratory measurement.

In accomplishing the foregoing objects, there is provided in accordance with the present invention a method for the determination of a three-dimensional stress state of rock, which comprises the steps of:

drilling a rock to form a borehole with a substantially spherical bottom;

deforming said hole either by releasing the rock from the stresses by overcoring or by applying an external static pressure to the rock; and measuring displacements of the spherical bottom in at least xx, yy, zz, xy, yz and zx radial directions during the deformation of said hole.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE INVENTION

Figure 1:
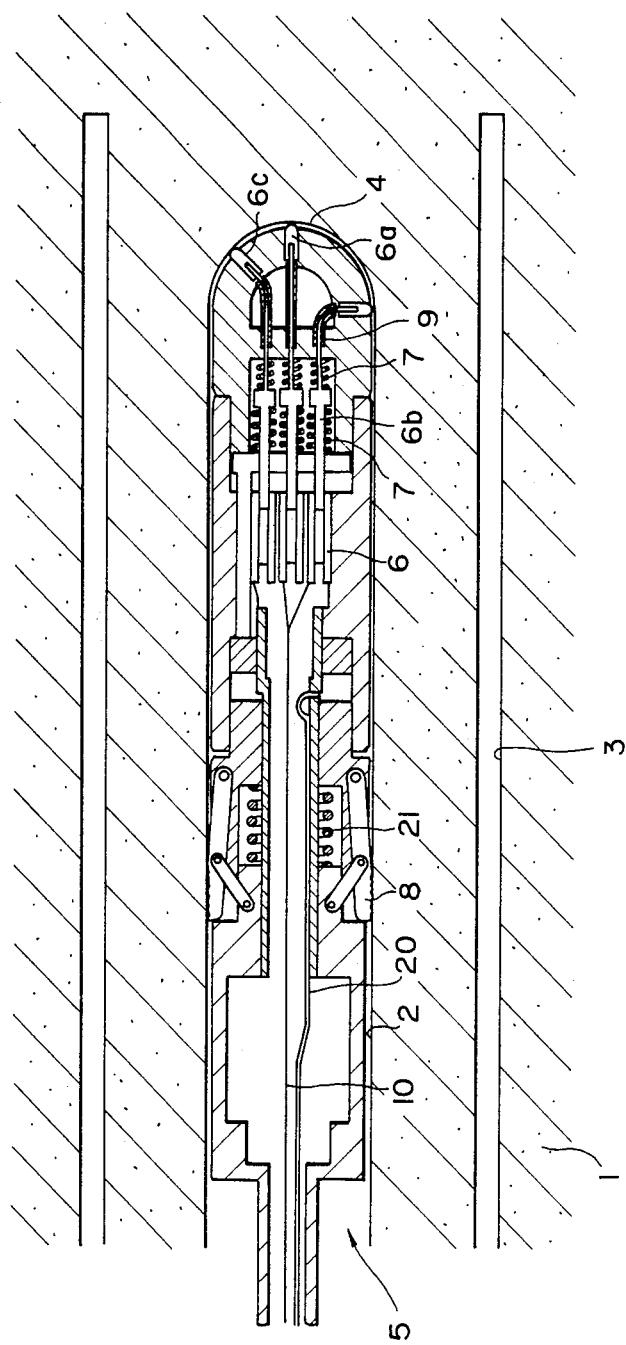
FIG. 1 is a cross-sectional view diagrammatically showing an apparatus applied for measuring in situ stresses of rock and set within a borehole.

FIG. 1 is a schematic explanatory view for carrying out a method for measuring in situ stresses of an underground rock 1. In this method, a drillhole 2 with a substantially spherical bottom 4 is first formed in the rock 1. Preferably, the borehole 2 has a diameter of 10–100 mm, more preferably 15–30 mm. Such a borehole 2 may be formed in any conventional manner.

An overcore 3 is then formed in any conventional manner to relieve the stresses acting on the spherical bottom 4 while measuring the displacements of the spherical bottom 4. It is important that the measurement of the displacements should be conducted along at least the following six radial directions of the sphere of the spherical bottom 4: xx, yy, zz, xy, yz and zx, wherein zz is a direction parallel with the axis Z of the borehole; xx and yy are directions parallel with the X- and Y-axes, respectively, where the X-, Y- and Z-axes provide three-dimensional, orthogonal coordinates; xy is a diagonal direction (direction with an angle of 45° relative to the X- or Y-axis) on the XY plane; and yz and zx are diagonal directions on the YZ and ZX planes, respectively.

The displacements of the spherical bottom 4 may be suitably measured by means of a displacement device 5 as shown in FIG. 1. The device 5 has an elongated tubular body with a outer diameter slightly smaller than the diameter of the borehole 2. The tubular body has a spherical closed end on the periphery of which at least small openings 6c are provided. A contact portion 6a is radially slidably disposed in each opening 6c. The openings 6c are so positioned that the contact portions 6a may be displaced along the directions of xx, yy, zz, xy, yz and zx directions when the device 5 is placed in the borehole 2 with the center of the spherical end coinciding with the center of the spherical bottom 4 of the borehole 2. In FIG. 1, only three contact portions oriented along the zz, xx and zx directions are illustrated.

Each contact portion 6a is normally urged radially outward by means of a spring 7 so that when the device 5 is set in position as shown in FIG. 1, the contact portions 6a are maintained in pressure contact with the surface of the spherical bottom 4. The reference numeral 8 designates a stopper or a lock arm for firmly fixing the device 5 in position. Each contact portion 6a is operatively connected by a suitable connecting rod 6b to a linear variable displacement transformer 6 which is known per se. A suitable guide tube 9 is provided around the rod 6b so that the movement of the contact portion 6a along its oriented direction is converted into the movement along the direction parallel with the axis of the device. Thus, the displacement or deformation of the spherical bottom 4 causes respective contact portions 6a to move, which movement is detected by the transformer 6. The detected signal is transmited through a line 10 to a suitable recording or indicating device (not shown). The reference numeral 20 designates a pipe for a hydraulic fluid which can move the lock arm 8 and the contact portions 6a in cooperation with springs 21 and 7 between service positions (as illustrated in FIG. 1) and non-service positions (as illustrated in FIG. 2).

From the thus measured displacements in respective directions caused by the overcoring, the three-dimensional stresses may be calculated in any known manner.

The rock stresses may also be determined by analyzing a core cut from the underground rock. Thus, in another embodiment according to the present invention, the phenomenon that the hysteresis rock stresses are relieved as residual displacements during coring operation is utilized for the determination of the rock stresses.

Figure 2:
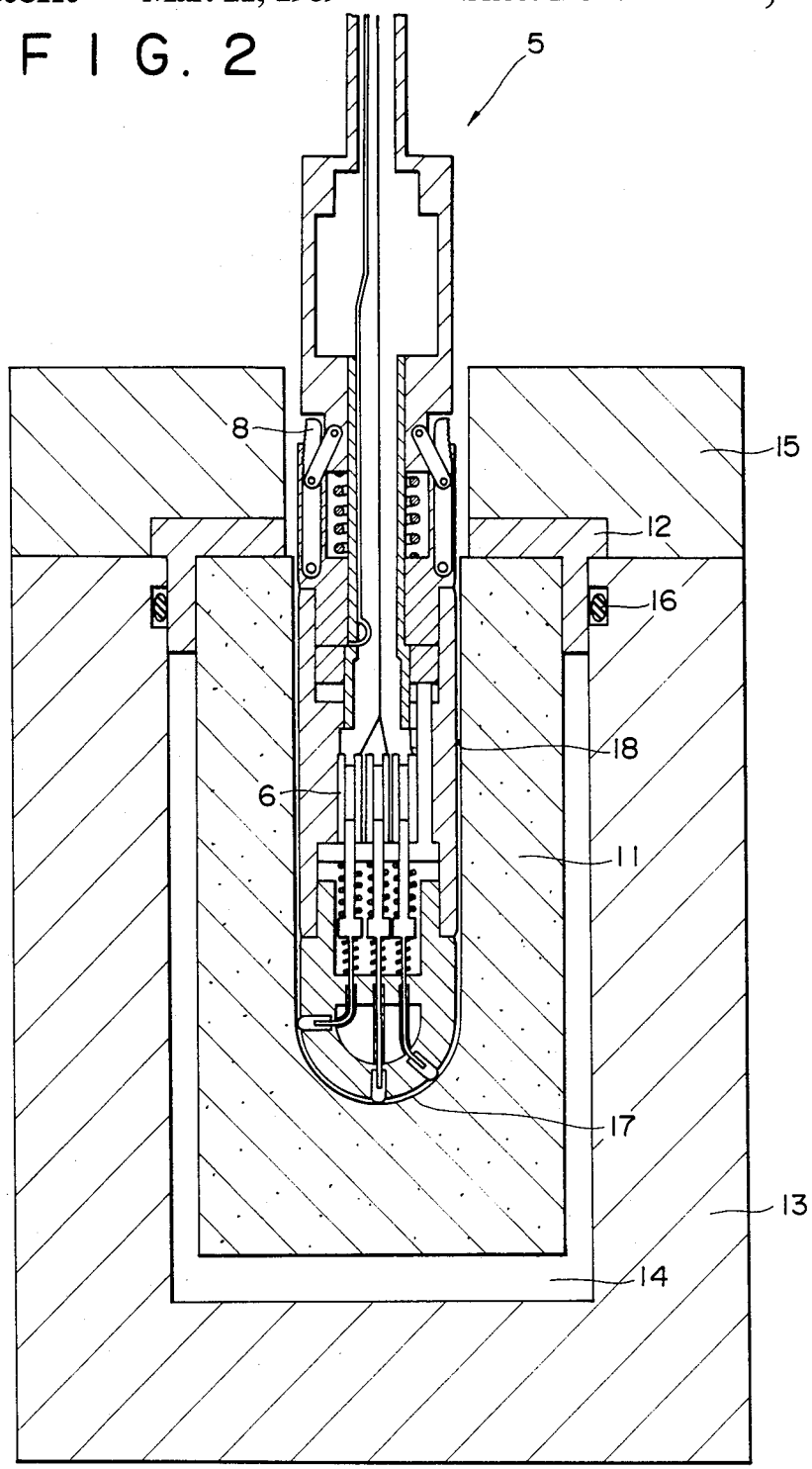
FIG. 2 is a cross-sectional view diagrammatically showing an apparatus applied for measuring hysteresis stresses of a core obtained,ly coring operation.

Referring to FIG. 2, a columnar core 11 obtained from an underground is drilled to form a concentrical hole 18 coaxially extending along the axis of the core 11 and having a substantially spherical bottom 17. A core obtained by overcoring in the above-described method and having a corehole formed in situ may also be suitably used. After attaching an end piece 12 on the top of the core 11 using an adhesive, the core 11 is set within a pressure vessel 13 such that a space 14 is defined between the vessel 13 and the core 11. Designated as 16 is a seal ring. After covering the top of the vessel 13 with a lid 15, a hydrostatic pressure by water or oil is applied to the space 14 by any known means (not shown) while measuring the displacements of the spherical bottom 17 of the core 110 along at least six radial directions of xx, yy, zz, xy, yz and zx. The measurement may be suitably effected by means of a displacement measuring device 5 of the same construction as described with reference to the embodiment of FIG. 1. The results of the displacement measurements give displacement-pressure curves in respective directions.

Figure 3:
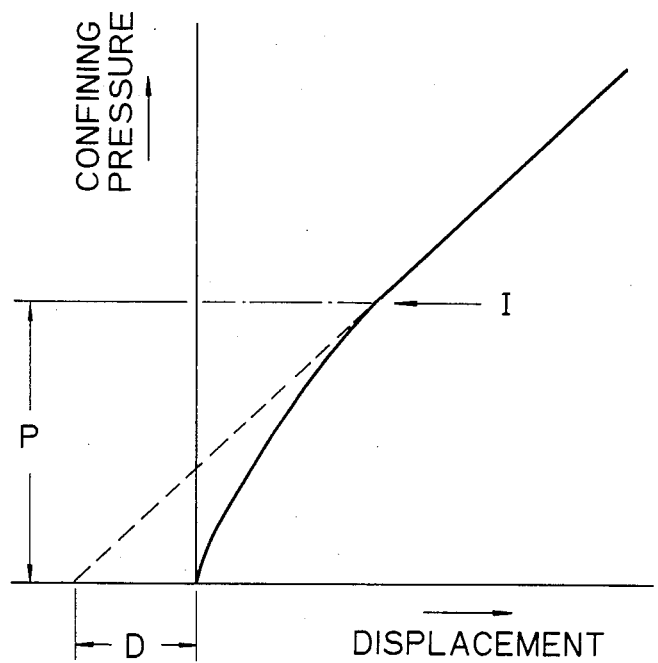
FIG. 3 is a pressure-displacement curve obtained by the measurement according to the procedure of FIG. 2.

A typical example of such a displacement-pressure curve is shown in FIG. 3. Due to the residual deformations which were formed during the coring as a result of the relief of the hysteresis stresses, a small displacement is seen in a low pressure region. At an increased confined pressure, there appears a point of inflexion I which is attributed to the hysteresis stresses. Then the displacement-pressure relationship shows an elastic deformation at pressures higher than that in the point of inflexion I. The inclination of the straight line represents the elastic modulus of the rock. The pressure P at the point of inflexion I represents the apparent hysteresis stresses under the experimental condition. The difference D between the elastic displacement and the actual displacement represents a residual displacement based on the stress history. From the value P or D obtained in the measurement in each of the above-described at least six directions, the stress state of the underground rock from which the core was cut may be calculated in any known manner.

As will be appreciated from the foregoing description, the method of the present invention permits simple, reliable and economical determination of a three-dimensional stress state of underground rock. Further, measured results of the in situ stresses may be confirmed by laboratory measurement of the core obtained during the in situ measurement.

It will be understood that the method of the present invention may also be applied to measure the anisotropic elasticities of underground rock. In addition, this method is applied to monitor three-dimensional deformation of a borehole in a rock continuously for a long period of time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method for the determination of three-dimensional stresses in rock, comprising the steps of:
    drilling a rock to form a borehole with a substantially spherical bottom;
    deforming said borehole either by releasing the rock from the stresses by overcoring or by applying an external static pressure to the rock; and
    measuring displacements of the spherical bottom in at least xx, yy, zz, xy, yz and zx radial directions during the deformation of said borehole.

2. A method as set forth in claim 1, wherein said measurement is by means of linear variable displacement transformers.

3. A method as set forth in claim 1, wherein the rock is an underground rock and the measurement of the displacements of the spherical bottom is performed in situ.

4. A method as set forth in claim 3, wherein the spherical bottom has a radius of 10 mm to 100 mm.

5. A method as set forth in claim 4, wherein the spherical bottom has a radius of 15 mm to 30 mm.

6. A method as set forth in claim 1, wherein the rock is sampled from an underground.

7. A method as set forth in claim 5, wherein the sampled rock is a columnar form with an outer diameter of 40 mm to 400 mm and wherein the spherical bottom has a radius of 10 mm to 100 mm.

8. A method as set forth in claim 7, wherein the sampled rock is a columnar form with an outer diameter of 60 mm to 120 mm and wherein the spherical bottom has a radius of 15 mm to 30 mm.

* * * * *